(12) United States Patent
Nakazawa

(10) Patent No.: US 8,718,249 B2
(45) Date of Patent: May 6, 2014

(54) COMMUNICATION DEVICE AND CONTROL DEVICE

(71) Applicant: Oki Data Corporation, Tokyo (JP)

(72) Inventor: Kazuo Nakazawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 13/771,113

(22) Filed: Feb. 20, 2013

(65) Prior Publication Data

US 2013/0223603 A1 Aug. 29, 2013

(30) Foreign Application Priority Data

Feb. 27, 2012 (JP) .................................. 2012-039690

(51) Int. Cl.
*H04M 11/00* (2006.01)
(52) U.S. Cl.
CPC ....... *H04M 11/00* (2013.01); *H04N 2201/0094* (2013.01)
USPC ...................................... 379/100.01; 358/1.14
(58) Field of Classification Search
USPC ............. 379/100.01, 100.05, 100.06, 100.15; 358/1.14
See application file for complete search history.

(56) References Cited

U.S. PATENT DOCUMENTS

| 5,530,951 A * | 6/1996 | Argintar | 379/100.12 |
| 5,668,642 A * | 9/1997 | Yoshida | 358/437 |
| 2010/0033751 A1* | 2/2010 | Kitamura | 358/1.14 |

FOREIGN PATENT DOCUMENTS

JP 07-273866 A 10/1995

* cited by examiner

*Primary Examiner* — Stella Woo
(74) *Attorney, Agent, or Firm* — Marvin A. Motsenbocker; Mots Law, PLLC

(57) ABSTRACT

A communication device includes a communication unit configured to send and receive data via an attachable and detachable line, a power controller configured to reduce a power supply to the communication unit when a certain condition is satisfied, and a determination unit configured to determine whether or not a setting for sending and receiving data via the line by the communication unit is made. The power controller maintains the power supply to the communication unit at a call-receivable level, if it is determined that the setting for using the line is made.

20 Claims, 7 Drawing Sheets

COMMUNICATION DEVICE AND CONTROL DEVICE

CROSS REFERENCE TO RELATED APPLICATIONS

This application claims priority based on 35 USC 119 from prior Japanese Patent Application No. 2012-039690 filed on Feb. 27, 2012, entitled "COMMUNICATION DEVICE AND CONTROL DEVICE", the entire contents of which are incorporated herein by reference.

BACKGROUND OF THE INVENTION

1. Field of the Invention

This disclosure relates to a communication device and a control device.

2. Description of Related Art

Recently in Europe, it became a requirement that energy-using products need to satisfy the EuP (Directive on Eco-Design of Energy-using Products) Lot 6 standard for energy conservation. According to this standard, a device needs to have a power management function. To be specific, when the device is not operated for a certain time period, it must automatically transition to a power-off mode.

In this connection, Patent Document 1 (Japanese Patent Application Publication No. Hei 7-273866) describes a telephone device that is configured to judge that a connection failure occurs when a line voltage monitoring unit detects that a line voltage is not higher than a preset certain voltage after the elapse of a preset stable time since a closure of the line. Upon detecting this condition, the telephone device gives a connection failure notification.

SUMMARY OF THE INVENTION

A device provided with a communication function is no longer able to receive calls if the device is automatically powered off upon satisfaction of a certain power-off condition, such as the device not being operated for a certain time period. For this reason, there are some devices provided with a communication function (e.g., a multifunction device including a facsimile function) which has a setting option to disable the automatic power-off. This type of device requires a user to take the trouble to perform the setting, which is bothersome as another function the user has to perform.

An objective of an embodiment of the invention is to provide a communication device and a control device which do not require a particular user operation for keeping the communication device from being automatically powered off and becoming unable to receive calls.

A first aspect of the invention is a communication device including: a communication unit configured to send and receive data via an attachable and detachable line; a power controller configured to reduce the power supply to the communication unit when a certain condition is satisfied; and a determination unit configured to determine whether or not a setting is made for sending and receiving data via the line by the communication unit. If it is determined that the setting for using the line is made, the power controller maintains the power supply to the communication unit at a call-receivable level A second aspect of the invention is a facsimile device including the communication device according to the first aspect.

A third aspect of the invention is a control device of a communication device including a communication unit configured to exchange data with a line. The control device includes: a power-off unit configured to cut off the power supply to the communication unit when a certain power-off condition is satisfied; and a determination unit configured to determine whether or not a certain setting is made for the communication unit to exchange data with the line. The power-off unit avoids cutoff of the power supply if the determination unit determines that the certain setting is made.

According to these aspects of the invention, it is possible to provide a communication device and a control device which do not require a particular user operation in order to keep the device from being automatically powered off and being unable to receive calls.

DETAILED DESCRIPTION OF EMBODIMENTS

Figure 1:
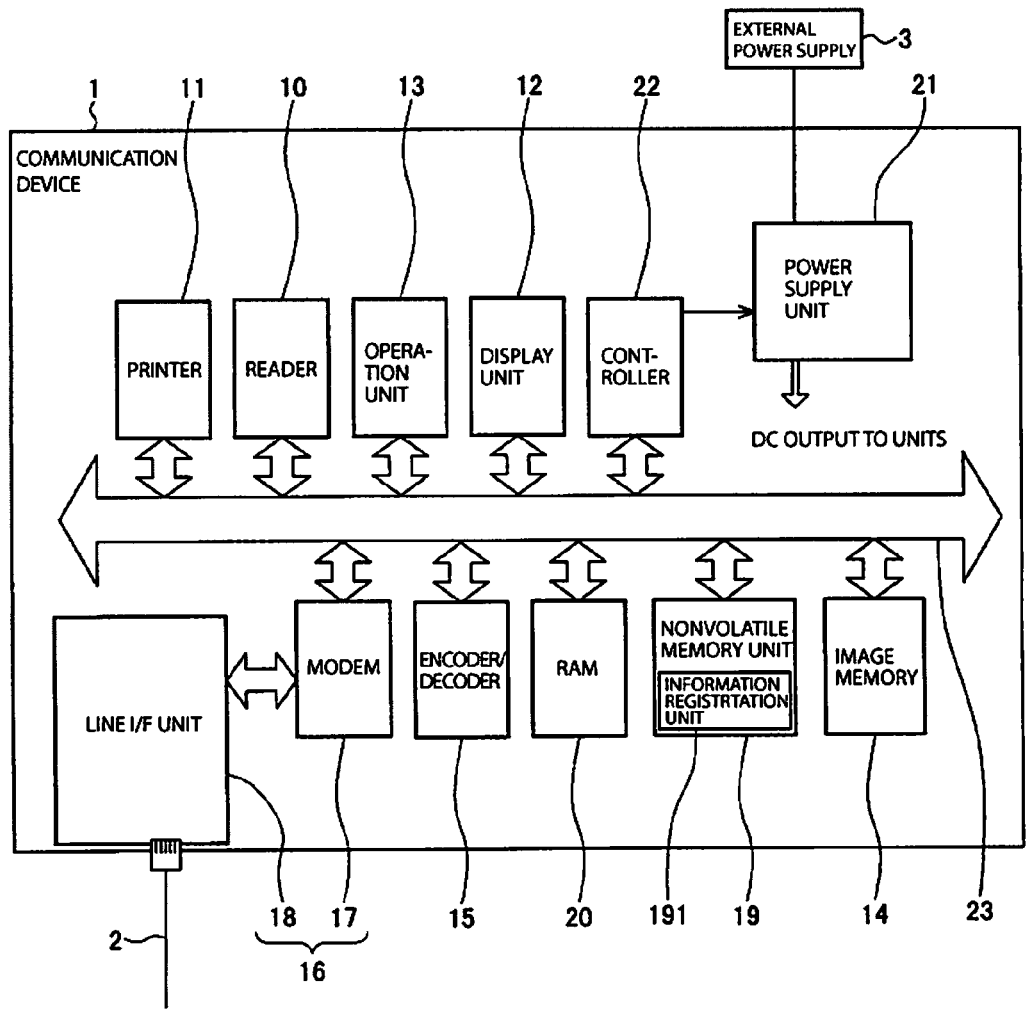
FIG. 1 is a block diagram showing a configuration of a communication device of Embodiment 1.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Hereinafter, embodiments of the invention are described according to the drawings.

Embodiment 1

FIG. 1 is a block diagram showing a configuration of communication device 1 of Embodiment 1. Communication device 1 is a communication terminal device communicating with line (or network) 2. Specifically, communication device 1 is a device capable of providing multiple functions to a user, and includes one or more functions for executing processing in response to a user operation, other than the communication function. In the embodiments, communication device 1 is a multifunction device provided with at least one of a facsimile function as a communication function, a copy function, and a printer function. Here, line 2 is a telephone line.

In FIG. 1, communication device 1 includes reader 10, printer 11, display unit 12, operation unit 13, image memory 14, encoder/decoder 15, communication unit 16, nonvolatile memory unit 19, RAM (Random Access Memory) 20, power supply unit 21, controller 22, and data bus 23.

Reader 10 reads an original document to be sent by facsimile or an original to be copied, and converts it into image data.

Printer 11 prints an image. To be specific, printer 11 prints image data acquired by reader 10 or image data received by communication unit 16.

Display unit 12 displays information such as an operation state of communication device 1, and includes a liquid crystal display (LCD) and a light emitting diode (LED), for example.

Operation unit 13 is a user interface for receiving operations for communication device 1 from the user, and is formed of a numeric keypad, a start/stop key for starting and stopping various operations, and the like.

Image memory 14 is a memory for accumulating image data. Specifically, image memory 14 stores therein transmission image information which is image data to be sent by facsimile and read by reader 10, and reception image data which is image data received by facsimile by communication unit 16.

Encoder/decoder 15 compresses transmission image information stored in image memory 14 by a certain coding scheme such as Modified Huffman (MH) coding, Modified READ (Relative Element Address Designate) (MR) coding, and Modified Modified READ (Relative Element Address Designate) (MMR) coding. Encoder/decoder 15 also expands reception image information stored in image memory 14 by a certain decoding scheme such as MH decoding, MR decoding, and MMR decoding.

Communication unit 16 exchanges data with line 2. In the example in FIG. 1, communication unit 16 includes modem 17 and line I/F unit 18.

Modem 17 modulates transmission facsimile data acquired by encoder/decoder 15 and outputs it to line I/F unit 18. Modem 17 also demodulates facsimile data received by line I/F unit 18 and stores reception image information in image memory 14.

Line I/F unit 18 is a communication interface for exchanging data with line 2. To be specific, line I/F unit 18 sends modulated facsimile data received from modem 17 to line 2. Line I/F unit 18 also receives facsimile data from line 2 and sends it to modem 17. Line I/F unit 18 performs certain network control according to the control by controller 22, at the time of transmission and reception of calls Nonvolatile memory unit 19 is a readable/writable nonvolatile memory for storing information such as various control programs, and is a flash ROM, for example. Nonvolatile memory unit 19 includes information registration unit 191 in which information used by communication unit 16 for data exchange (e.g., facsimile transmission and reception) with line 2 can be registered. Specifically, information registration unit 191 accepts registration of information by the user via operation unit 13 or the like, and stores the information. Information stored in information registration unit 191 includes address information on communication destinations and own-device information, for example. Examples of address information include: destination telephone numbers such as abbreviated dial numbers and one-touch dial numbers; and caller telephone numbers based on which it is judged whether or not to receive a call from a caller telephone number sent from an exchange for a calling line identification service or the like in a call-incoming event. Own-device information is the telephone number of the own device (communication device 1 itself), for example.

RAM 20 is a memory for storing various data, and is used as a work area or the like for overall control of the communication device.

Power supply unit 21 receives a supply of power from external power supply 3 of communication device 1, and supplies power to units of communication device 1. In the embodiments, power supply unit 21 is: connected to an AC power supply (specifically, a commercial power supply) serving as external power supply 3; a low-voltage power supply which converts AC output from the AC power supply into a DC output and supplies it to the units of communication device 1; and a power source of operations of the units of communication device 1.

Controller 22 performs the overall control of communication device 1. Specifically, controller 22 includes a central processing unit (CPU), and controls the entire communication device according to various control programs stored in nonvolatile memory unit 19 while using RAM 20 as a work area. Controller 22 has an automatic power-off function for automatically (i.e., without the need for a power-off operation by the user) cutting off power supply to communication unit 16 or to other units when a certain power-off condition is satisfied. Details of this function are described later. Data bus 23 mutually connects the aforementioned units of communication device 1.

Figure 2:
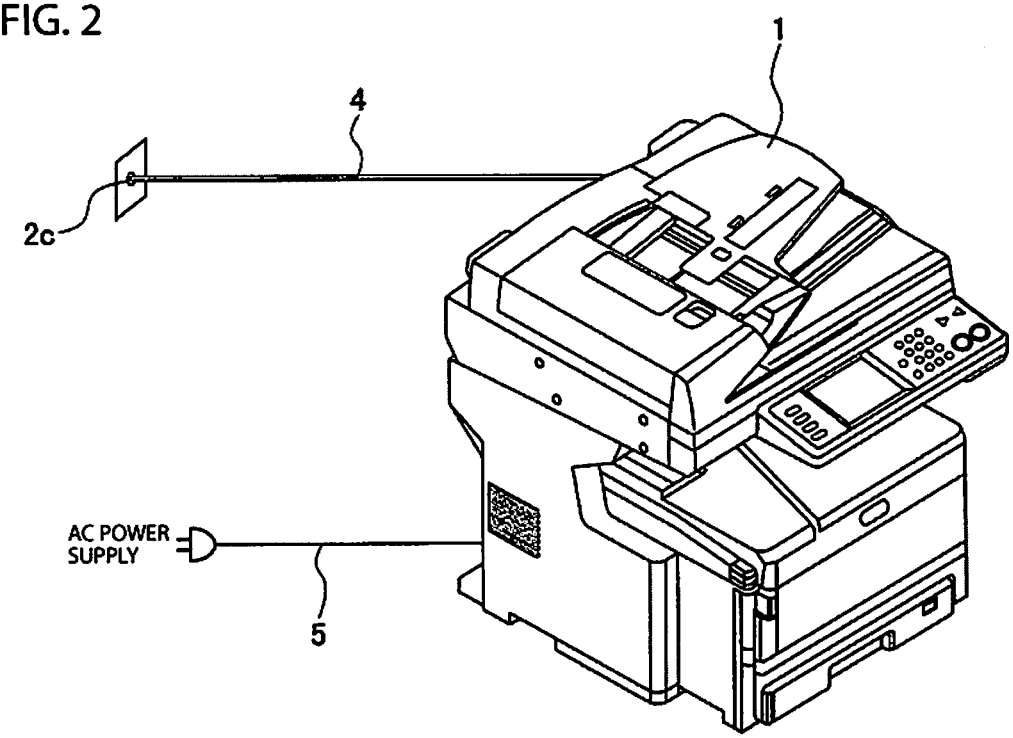
FIG. 2 is a perspective view of a whole system including the communication device.

FIG. 2 is a perspective view showing an entire system including communication device 1. As shown in FIG. 2, communication device 1 is connected to connector 2c of line 2 via communication cable 4, and is connected to the AC power supply serving as external power supply 3 via power cable 5.

Figure 3:
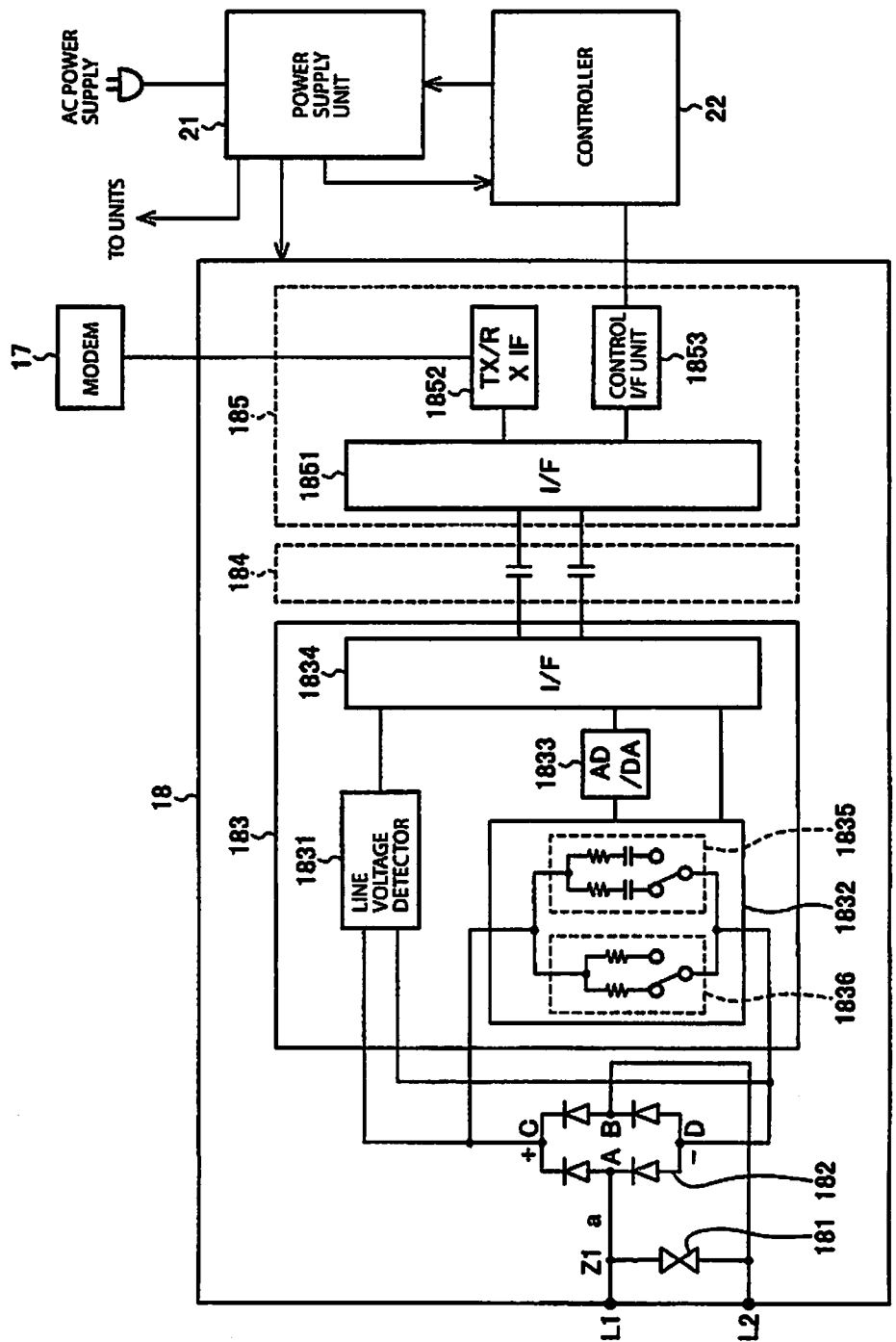
FIG. 3 is a block diagram showing a configuration of a line I/F unit.

FIG. 3 is a block diagram showing a configuration of line I/F unit 18. In FIG. 3, line I/F unit 18 includes terminals L1, L2, lightning surge protection element 181, diode bridge 182, network-side circuit 183, isolation and transfer unit 184, and controller-side circuit 185. Specifically, line I/F unit 18 is provided with a silicon Data Access Arrangement (DAA) formed of network-side circuit 183, controller-side circuit 185, and isolation and transfer unit 184 which galvanically isolates the two circuits from each other and transfers data and signals therebetween.

Terminals L1, L2 are terminals to be connected to line 2. The pair of terminals L1, L2 are provided with lightning surge protection element 181 such as a varistor connected therebetween, and are respectively connected to terminals A, B of diode bridge 182. Terminal C on the plus side and terminal D on the minus side of diode bridge 182 are connected to line voltage detector 1831 in network-side circuit 183. Line voltage detector 1831 detects a line voltage of line 2. A detection output of line voltage detector 1831 is connected to line-side isolation I/F unit 1834 in network-side circuit 183. Terminals C, D of diode bridge 182 are connected to hybrid network 1832 in network-side circuit 183. Hybrid network 1832 includes impedance switch unit 1835 and DC resistance switch unit 1836. Hybrid network 1832 is connected to AD/DA converter 1833 and line-side isolation I/F unit 1834. Line-side isolation I/F unit 1834 is connected to isolation and transfer unit 184. Isolation and transfer unit 184 is connected to controller-side isolation I/F unit 1851 in controller-side circuit 185. Controller-side isolation I/F unit 1851 is connected to TX/RX IF unit 1852 and control I/F unit 1853 in controller-side circuit 185. TX/RX IF unit 1852 is connected to modem 17, and control I/F unit 1853 is connected to controller 22.

Figure 4:
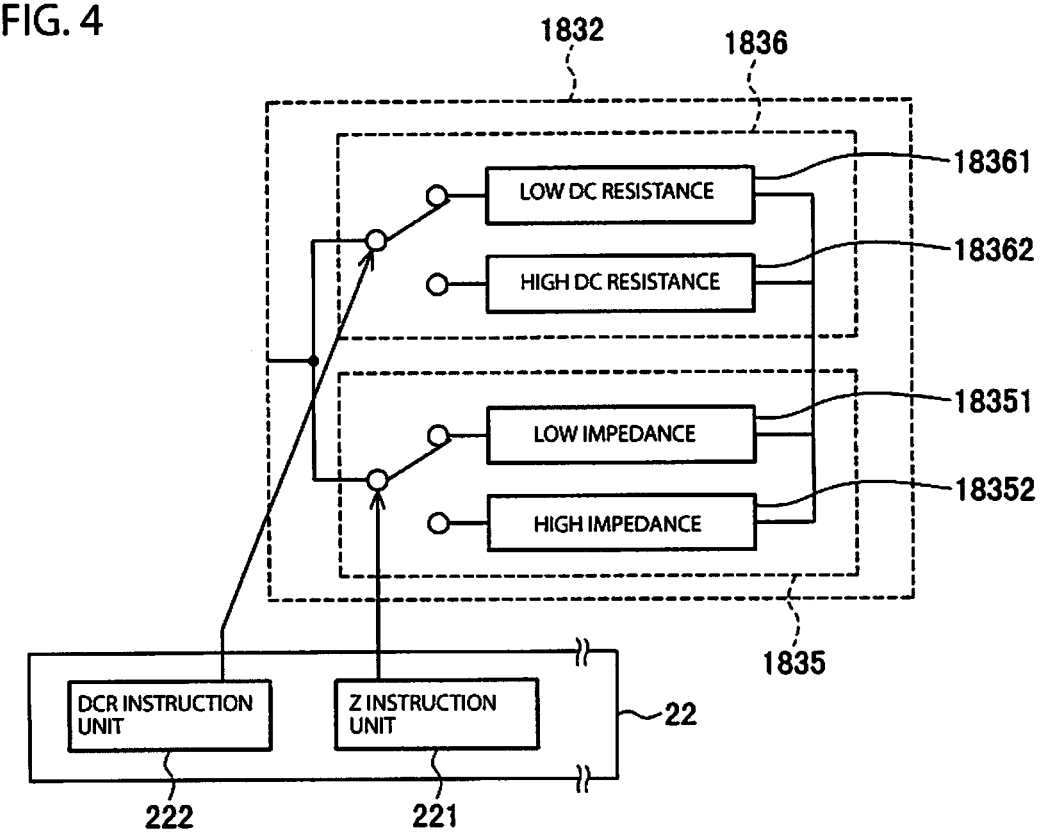
FIG. 4 is a diagram showing a configuration of a hybrid network.

FIG. 4 is a diagram showing a configuration of hybrid network 1832. Hybrid network 1832 includes impedance switch unit 1835 and DC resistance switch unit 1836. Impedance switch unit 1835 includes low impedance 18351 and high impedance 18352, and switches the impedance between low impedance 18351 and high impedance 18352 according to the control performed by controller 22 (specifically, later-mentioned impedance switch instruction unit 221). DC resistance switch unit 1836 includes low DC resistance 18361 and high DC resistance 18362, and switches the DC resistance between low DC resistance 18361 and high DC resistance 18362 according to the control performed by controller 22 (specifically, later-mentioned DC resistance switch instruction unit 222).

Figure 5:
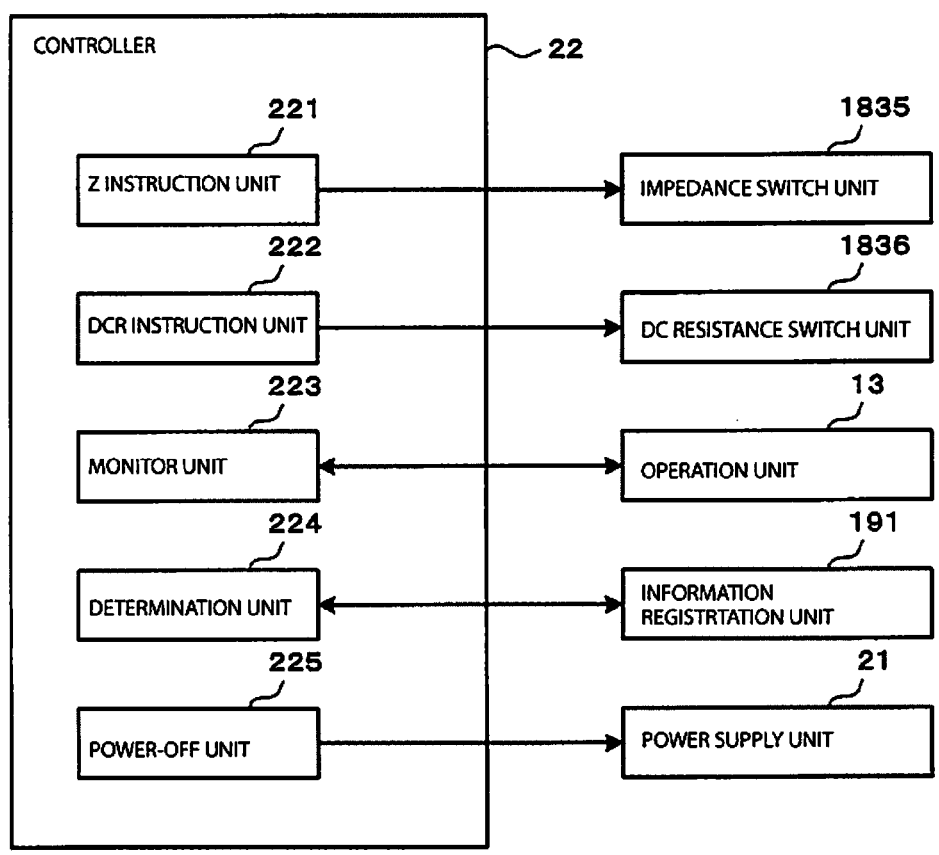
FIG. 5 is a block diagram showing a configuration of a controller.

FIG. 5 is a block diagram showing a configuration of controller 22. In FIG. 5, controller 22 includes impedance switch instruction unit (Z instruction unit) 221, DC resistance switch instruction unit (DCR instruction unit) 222, monitor unit 223, determination unit 224, and power-off unit 225 as a power controller.

Impedance switch instruction unit 221 outputs an impedance switch instruction to impedance switch unit 1835, and DC resistance switch instruction unit 222 outputs a DC resistance switch instruction to DC resistance switch unit 1836.

Monitor unit 223 monitors operations performed on communication device 1. Monitor unit 223 then measures the duration of a state where communication device 1 is not operated, the duration of a standby state where communication device 1 waits for a next operation, or the duration of an inactive state where communication device 1 is not activated. For example, monitor unit 223 measures the time elapsed from the end of the last action (or job), or from the last operation. Operations to be performed on communication device 1 include a user operation performed on operation unit 13 of communication device 1, operation or instruction (e.g., a print request) from a user or an external device via a communication path such as line 2, and the like. In this description, the operations performed on communication device 1 are user operations performed on operation unit 13.

Determination unit 224 determines whether or not certain settings for exchanging data with line 2 by communication unit 16 are made. To be specific, in Embodiment 1, determination unit 224 determines whether or not information (e.g., address information) is registered in information registration unit 191.

Power-off unit 225 cuts off the power supply to communication unit 16 when a certain power-off condition is satisfied. To be specific, the power-off condition is a condition for cutting off the power supply to communication unit 16 without a power-off operation by the user (automatically), and is done with the elapse of a certain time period with no operation performed on communication device 1 in this example. In other words, in this example, power-off unit 225 cuts off the power supply to communication unit 16 when no operation is performed on communication device 1 for a certain time period. Note, however, that the power-off condition is not limited to this, and may be a different condition such as when the current time reaches a certain time. Specifically, when time measured by monitor unit 223 reaches a certain time, power-off unit 225 controls power supply unit 21 such that the power supply from power supply unit 21 to communication unit 16 is cut off. The operation of cutting off the power supply to communication unit 16 may include a case of virtually cutting off the power supply to communication unit 16, other than completely cutting off power supply to communication unit 16. To be specific, power-off unit 225 may virtually cut off the power supply to the extent that a communication function of communication unit 16 is turned off, or to the extent that communication by communication unit 16 is disabled. Alternatively, power-off unit 225 may transition to an off-mode where all functions, or virtually all functions, of communication device 1 are turned off when a certain power-off condition is satisfied. In the off-mode, the power supply from power supply unit 21 to the units of communication device 1 is cut off, and power consumed by communication device 1 as a whole is 0.5 W or less, for example.

Note, however, that power-off unit 225 does not cut off the power supply if determination unit 224 determines that the aforementioned certain settings are made. In other words, even when the certain power-off condition is satisfied, power-off unit 225 maintains the power supply if determination unit 224 determines that the aforementioned certain settings are made. In Embodiment 1, power-off unit 225 does not cut off the power supply when determination unit 224 determines that information is registered in information registration unit 191.

Figure 6:
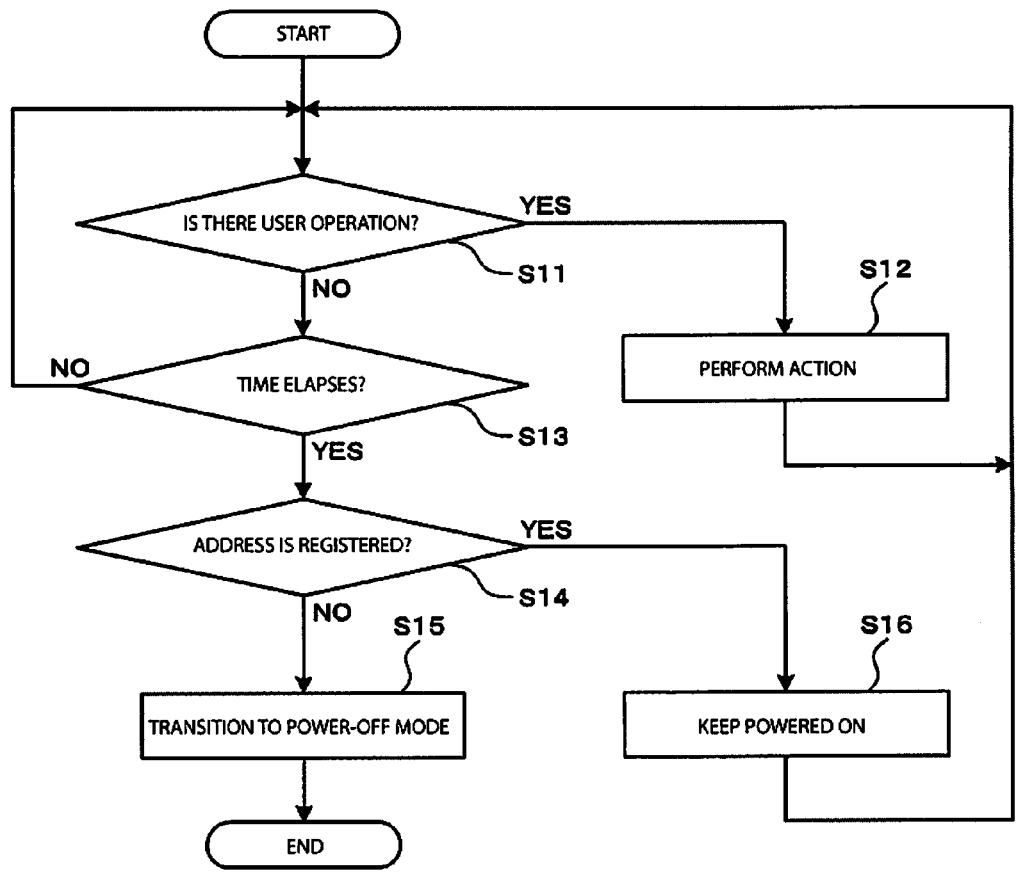
FIG. 6 is a flowchart showing an operation of the controller of Embodiment 1.

FIG. 6 is a flowchart showing an operation of controller 22 of Embodiment 1. Hereinafter, a description is given of the operation of controller 22 with reference to FIG. 6. The processing of FIG. 6 is performed when communication device 1 is in a standby state (standby mode).

In the standby state of communication device 1, controller 22 monitors operations by the user and determines whether or not the user operates communication device 1 (S11).

If it is determined that the user operates communication device 1 (S11: YES), controller 22 makes communication device 1 transition from the standby state to an operation mode, performs various operations such as facsimile transmission and copying according to the operation of the user (S12), and upon completion of the operation, resumes the standby state of communication device 1, returning to step S11.

On the other hand, if it is determined that the user does not operate communication device 1 (S11: NO), controller 22 determines whether or not a predetermined time passes in the standby state, in other words, determines whether or not the user does not operate communication device 1 for a certain time (S13). Specifically, controller 22 determines whether or not the time measured by monitor unit 223 exceeds the predetermined time.

If it is determined that the predetermined time passes (S13: YES), controller 22 proceeds to step S14, and if not (S13: NO), controller 22 returns to step S11.

In step S14, controller 22 determines whether or not address information is registered in information registration unit 191.

If it is determined that address information is not registered in information registration unit 191 (S14: NO), controller 22 determines that the line is not connected (line disconnected), makes communication device 1 transition from the standby state to a power-off mode (S15), and ends the processing.

On the other hand, if it is determined that address information is registered in information registration unit 191 (S14: YES), controller 22 determines that the line is connected (line connected), and does not make communication device 1 transition to the power-off mode but keeps it in the standby mode (i.e., power-on state) (S16).

According to Embodiment 1 described above, the following effects (1) and (2) can be obtained.

(1) In Embodiment 1, the controller determines whether or not the certain settings for exchanging data with the line by the communication unit are made, and if it is determined that the certain settings are made, the controller does not cut off the power supply to the communication unit even when the certain power-off condition is satisfied. Accordingly, Embodiment 1 makes it possible to prevent the state of being unable to receive calls due to the cutoff of the power supply (i.e., the state of being automatically powered off), without requiring particular user operation. To be specific, user operation is made simpler than the case where the user has to take the trouble to perform settings in order to avoid automatic power-off of the device.

(2) In one aspect, the controller determines whether or not information is registered in the information registration unit, and if it is determined that information is registered, the controller does not cut off the power supply. Embodiment makes it possible to easily determine whether the communication unit is in use (or whether the communication unit is connected to the line), and thus to easily determine whether or not to avoid a cutoff of the power supply to the device.

Embodiment 2

Hereinafter, a communication device of Embodiment 2 is described. The communication device of Embodiment 2 is substantially the same as communication device 1 of Embodiment 1 described above, except for the processing performed by a determination unit. In the following description, parts similar to Embodiment 1 are omitted or simplified, and elements that are the same or correspond to those of Embodiment 1 are assigned the same symbols.

In Embodiment 2, determination unit 224 determines whether or not a connection (specifically, an electric connection) is established between communication unit 16 and line 2. To be specific, determination unit 224 determines whether or not a line voltage is detected by line voltage detector 1831.

Power-off unit 225 does not cut off the power supply if determination unit 224 determines that a connection is established between communication unit 16 and line 2. In other words, even when a certain power-off condition is satisfied, power-off unit 225 maintains the power supply if determination unit 224 determines that the connection is established.

Figure 7:
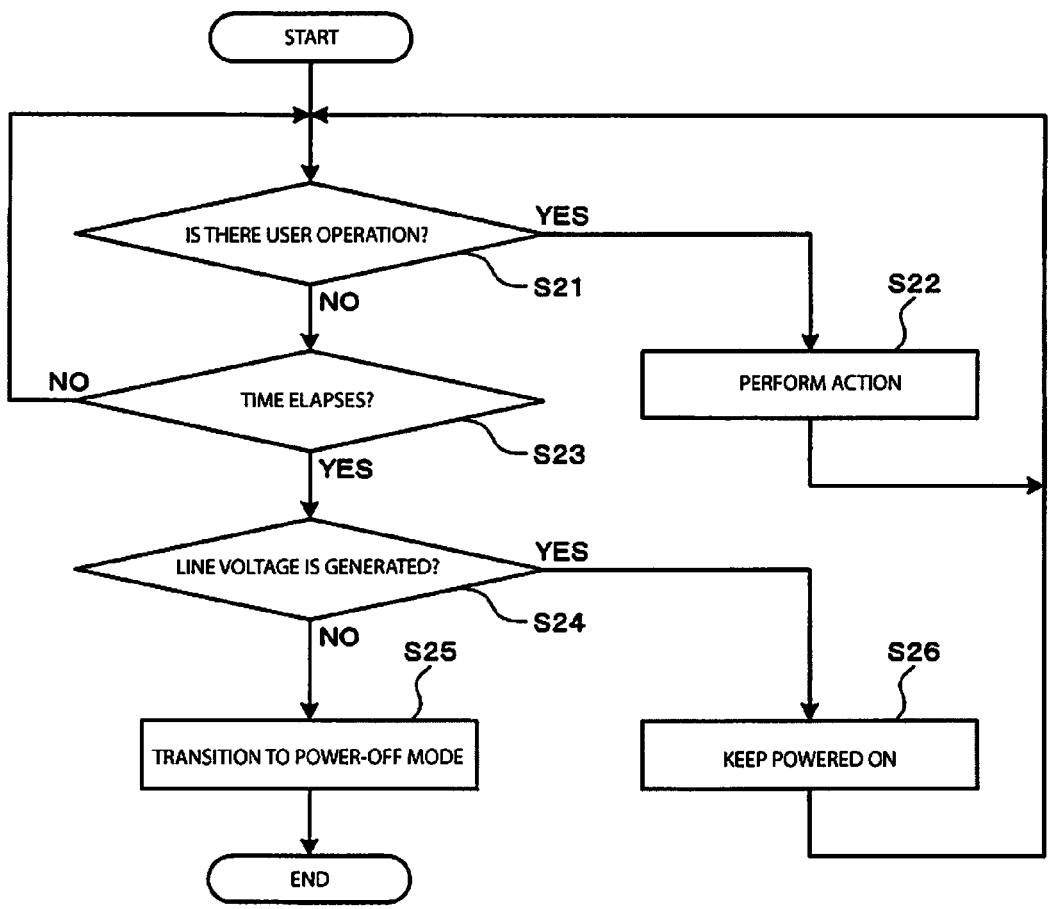
FIG. 7 is a flowchart showing an operation of a controller of Embodiment 2.

FIG. 7 is a flowchart showing an operation of controller 22 of Embodiment 2. Hereinafter, a description is given of the operation of controller 22 with reference to FIG. 7. The processing of FIG. 7 is performed when communication device 1 is in a standby state (standby mode).

In the standby state of communication device 1, controller 22 monitors operations by the user and determines whether or not the user operates communication device 1 (S21).

If it is determined that the user operates communication device 1 (S21: YES), controller 22 makes communication device 1 transition from the standby state to an operation mode, performs various operations according to the operation of the user (S22), and upon completion of the operation, resumes the standby state of communication device 1 to return to step S21.

On the other hand, if it is determined that the user does not operate communication device 1 (S21: NO), controller 22 determines whether or not a predetermined time passes in the standby state. In other words, the controller determines whether or not the user does not operate communication device 1 for a certain time (S23).

If it is determined that the predetermined time passes (S23: YES), controller 22 proceeds to step S29, and if not (S23: NO), controller 22 returns to step S21.

In step S24, controller 22 checks the result of detection by line voltage detector 1831 to determine whether or not a line voltage is generated.

If it is determined that no line voltage is generated (S24: NO), controller 22 determines that the line is not connected (line disconnected), makes communication device 1 transition from the standby state to a power-off mode (S25), and ends the processing.

On the other hand, if it is determined that a line voltage is generated (S24:YES), controller 22 determines that the line is connected (line connected), and does not make communication device 1 transition to the power-off mode but keeps it in the standby mode (or power-on state) (S26).

According to Embodiment 2 described above, the following effects (3) and (4) can be obtained in addition to the effect (1) described above.

(3) In embodiment 2, the controller determines whether or not a connection is established between the communication unit and the line. If it is determined that the connection is established, the controller does not cut off the power supply to the communication unit even when the certain power-off condition is satisfied. Accordingly, Embodiment 2 makes it possible to more adequately determine whether or not to avoid a cutoff of the power supply to the device.

(4) In one aspect, the controller determines whether or not a line voltage is detected, and if it is determined that a line voltage is generated, the controller does not cut off the power supply. Embodiment 2 makes it possible to surely or easily determine whether or not a connection is established between the communication unit and the line.

Note that the controller of the aforementioned embodiments may be implemented by only a hardware resource such as an electronic circuit, or may be implemented as a combination of a hardware resource and software. In the case of being implemented as a combination of a hardware resource and software, the controller is implemented by executing a computer program by a computer, for example, and more specifically, is implemented by reading a computer program recorded in a recording medium, such as a ROM, by a main memory device and executing it by a central processing unit (CPU). The computer program may be provided by being recorded in a computer-readable recording medium such as an optical disc, or may be provided via a communication line such as the Internet.

The invention is not limited to the above embodiments, but may be implemented in various modes without departing from the gist of the invention.

For example, although a multifunction device with a facsimile function is used as an example of the communication device in the above description, the communication device may be other types of devices, such as a multifunction device with a telephone function, and the like.

In addition, although a telephone line is used as the line in the above description, the line may be other types of lines, such as a network line including the Internet line, and the like. The line is not limited to wired lines, but may be a wireless line.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. A communication device comprising:
    a communication unit configured to send and receive data via an attachable and detachable line;
    a power controller configured to control a power supply to the communication unit;
    a monitor unit configured to monitor whether or not a certain power reduction condition in which the power supply to the communication unit is reduced is satisfied;
    a determination unit configured to determine whether or not the communication unit is connected with the line;
    wherein the power controller maintains is configured, when the certain power reduction condition is satisfied and the communication unit is not connected to the line, to reduce the power supply to the communication unit, and is configured, when the certain power reduction condition is satisfied and the communication unit is connected to the line, to maintain the power supply to the communication unit at a call-receivable level.

2. The communication device according to claim 1 further comprising:
an information registration unit configured to register therein information to be used by the communication unit for using the line; and
an information-registration determination unit configured to determine whether or not the information is registered in the information registration unit, wherein
the power controller maintains the power supply to the communication unit at the call-receivable level if the information-registration determination unit determines that the information is registered.

3. The communication device according to claim 1, wherein
the power controller maintains the power supply to the communication unit if the information-registration determination unit determines that telephone number information is registered as the information.

4. The communication device according to claim 1, further comprising a connection determination unit configured to determine whether or not a connection is established between the communication unit and the line, wherein
the power controller maintains the power supply to the communication unit at the call-receivable level if the connection determination unit determines that the connection is established.

5. The communication device according to claim 4, wherein
the connection determination unit further comprises a voltage detector configured to determine that a connection is established between the communication unit and the line if a certain line voltage is detected from the line, wherein
the power controller maintains the power supply to the communication unit at the call-receivable level if it is determined that the line voltage is detected.

6. The communication device according to claim 5, wherein the line is a telephone line and the communication unit is a facsimile communication unit.

7. The communication device according to claim 1, wherein:
the power controller comprises a timer unit configured to determine, as the certain condition, that no operation is performed for a certain time period; and
the power controller reduces the power supply to the communication unit to a call-reception disabled level if no operation is performed for the certain time period and if the setting for using the line is not made.

8. The communication device according to claim 7, wherein the call-reception disabled level corresponds to no power being supplied to the communication unit.

9. The communication device according to claim 1, wherein:
the power controller comprises a timer unit configured to determine, as the certain condition, that no operation is performed for a certain time period; and
the power controller cuts off the power supply to the communication unit if no operation is performed for the certain time period and if the setting for using the line is not made.

10. A facsimile device comprising the communication device according to claim 1.

11. The communication device according to claim 1, further comprising:
a telephone number storage configured to store therein a telephone number,
wherein the determination unit is configured to determine whether or not the communication unit is connected to the line by determining whether or not the telephone number is stored in the telephone number storage, and
the power controller is configured, when the certain power reduction condition is satisfied and the telephone number is not stored in the telephone number storage, to reduce the power supply to the communication unit, and is configured, when the certain power reduction condition is satisfied and the telephone number is stored in the telephone number storage, to maintain the power supply to the communication unit at the call-receivable level.

12. The communication device according to claim 11, wherein the telephone number storage is one of a destination number registration memory, an abbreviated dial numbers registration memory, a one-touch dial numbers registration memory, and a caller telephone numbers registration memory.

13. The communication device according to claim 12, wherein the telephone number is a telephone number that is assigned to the communication device.

14. The communication device according to claim 1, wherein the determination unit is configured to determine whether or not the communication unit is connected to the line by determining whether or not a predetermined voltage is detected at the communication unit, and
the power controller is configured, when the certain power reduction condition is satisfied and the predetermined voltage is not detected at the communication unit, to reduce the power supply to the communication unit, and is configured, when the certain power reduction condition is satisfied and the predetermined voltage is not detected at the communication unit, to maintain the power supply to the communication unit at the call-receivable level.

15. A control device of a communication device including a communication unit configured to exchange data with a line, comprising:
a power controller configured to control a power supply to the communication unit;
a monitor unit configured to monitor whether or not a certain power reduction condition in which the power supply to the communication unit is cut-off is satisfied;
a determination unit configured to determine whether or not the communication unit is connected with the line,
wherein power controller is configured, when the certain power reduction condition is satisfied and the communication unit is not connected to the line, to cut-off the power supply to the communication unit, and is configured, when the certain power-off condition is satisfied and the communication unit is connected to the line, to avoid a cutoff of the power supply to the communication unit.

16. The control device according to claim 15, wherein:
the power-off unit comprises a timer unit configured to determine, as the certain condition, that no operation is performed for a certain time period;
the power-off unit reduces the power supply to the communication unit to a call-reception disabled level if no operation is performed for the certain time period and if the setting for using the line is not made; and
the call-reception disabled level corresponds to no power being supplied to the communication unit.

17. The control device according to claim 15, further comprising:
a telephone number storage configured to store therein a telephone number,
wherein the determination unit is configured to determine whether or not the communication unit is connected to the line by determining whether or the telephone number is stored in the telephone number storage, and
the power controller is configured, when the certain power reduction condition is satisfied and the telephone number is not stored in the telephone number storage, to reduce the power supply to the communication unit, and is configured, when the certain power reduction condition is satisfied and the telephone number is stored in the telephone number storage, to maintain the power supply to the communication unit at the call-receivable level.

18. The control device according to claim 17, wherein the telephone number storage is one of a destination number registration memory, an abbreviated dial numbers registration memory, a one-touch dial numbers registration memory, and a caller telephone numbers registration memory.

19. The control device according to claim 18, wherein the telephone number is a telephone number that is assigned to the communication device.

20. The control device according to claim 15, wherein the determination unit is configured to determine whether or not the communication unit is connected to the line by determining whether or not a predetermined voltage is detected at the communication unit, and the power controller is configured, when the certain power reduction condition is satisfied and the predetermined voltage is not detected at the communication unit, to reduce the power supply to the communication unit, and is configured, when the certain power reduction condition is satisfied and the predetermined voltage is not detected at the communication unit, to maintain the power supply to the communication unit at the call-receivable level.

\* \* \* \* \*